(12) United States Patent
Belpanno et al.

(10) Patent No.: US 7,930,956 B2
(45) Date of Patent: Apr. 26, 2011

(54) MULTI-SPINDLE SCREW MACHINE, AND IMPROVED TOOL ARM FOR USE THEREIN

(75) Inventors: Sandro G. Belpanno, Rochester, NY (US); Robert C. Kruse, Churchville, NY (US)

(73) Assignee: Brinkman Products, Inc., Rochester, NY (US)

( * ) Notice: Subject to any disclaimer, the term of this patent is extended or adjusted under 35 U.S.C. 154(b) by 951 days.

(21) Appl. No.: 11/302,830

(22) Filed: Dec. 14, 2005

(65) Prior Publication Data

US 2007/0155514 A1 Jul. 5, 2007

(51) Int. Cl.
*B23B 5/00* (2006.01)
(52) U.S. Cl. .......................... 82/110; 82/147
(58) Field of Classification Search ............. 82/110, 82/117, 142, 147, 111
See application file for complete search history.

(56) References Cited

U.S. PATENT DOCUMENTS

| | | | | |
|---|---|---|---|---|
| 2,034,545 A | * | 3/1936 | Umstattd | 384/571 |
| 2,599,575 A | * | 6/1952 | Morgan | 464/179 |
| 3,717,956 A | * | 2/1973 | Keatts | 451/471 |
| 4,434,689 A | * | 3/1984 | Nall et al. | 82/113 |
| 4,498,820 A | * | 2/1985 | Brennan | 409/179 |
| 5,494,302 A | * | 2/1996 | Farris et al. | 280/276 |
| 2006/0266171 A1 | * | 11/2006 | Hugick et al. | 82/110 |

* cited by examiner

*Primary Examiner* — Boyer D Ashley
*Assistant Examiner* — Sara Addisu
(74) *Attorney, Agent, or Firm* — Phillips Lytle LLP

(57) ABSTRACT

An improved Davenport® multi-spindle automatic screw machine has a tool arm (14) mounted on a shaft (41) for rotational movement relative to a revolving head cap (13). A needle bearing (42, 42) is operatively arranged between the shaft and the revolving head cap. The bearing is radially loaded as said bearing is installed and that the individual needles of same remain elastically deformed by the radial load immediately after said bearing has been installed. The shaft has a hardened surface (52) that is engaged by the needles. The diameter of the shaft hardened surface portion is greater than the diameters of the adjacent shaft portions. Annular recesses (51, 53) extend into the shaft at either end of the hardened portion. These recesses have frusto-conical surfaces (55) that act as ramps to guide insertion of the press-fittable needle bearing into the space between the shaft and the head cap.

7 Claims, 2 Drawing Sheets

MULTI-SPINDLE SCREW MACHINE, AND IMPROVED TOOL ARM FOR USE THEREIN

TECHNICAL FIELD

The present invention relates generally to multiple-spindle automatic screw machines, such as a Davenport® multiple-spindle automatic screw machine, and, more particularly, to an improved mechanism by which a tool arm may be rotatably and tightly mounted on a revolving head cap of a screw machine so as to afford the capabilities of reduced tool chatter, increased tool life, tighter part tolerances, more-aggressive relative speeds and feeds between the tool and a workpiece, and substantially-extended service intervals in the most demanding machining applications.

BACKGROUND ART

A screw machine is a machine tool in which a tool is moved to engage a rotating workpiece.

A Davenport® multiple-spindle automatic screw machine (available from Davenport Machine, Inc., 167 Ames Street, Rochester, N.Y. 14611) typically has five workpiece-holding spindles that are rotatably indexable from station to station. At each station, a tool is adapted to be selectively moved to engage a rotating workpiece held in the proximate spindle. The tools are carried by tool arms that are pivotally mounted on the revolving head cap of the screw machine. These tool arms are selectively moved relative to the head cap at each station to cause the particular tool held therein to perform a specific machining operation on the relatively-rotating workpiece. Due to their popularity, versatility and adaptability, these machines are in continued use today, and are often upgraded to restore or improve performance.

Heretofore, a shaft (sometimes referred to as a "tool arm stud") has been positioned between a portion of the tool arm and a portion of the revolving head cap. The shaft was typically formed of a low-carbon low-alloy steel. A bronze bushing was loosely positioned between such relatively-movable portions of the tool arm and the head cap. The diametrical clearance between the bushing and the shaft or head cap was on the order of about 0.001 inches, when newly installed. As the machine was used, normal wear would cause this diametrical clearance to increase. This resulted in increased tool chatter, decreased tool life, looser part tolerances, less-aggressive speeds and feeds of the tool relative to the workpiece, and service intervals of about one week in the most demanding of machining applications.

Accordingly, it would be desirable to reduce the deleterious effects of such increases in diametrical clearance, while keeping costs to a practical minimum. At the same time, it would also be desirable to extend the service life of existing Davenport® screw machines.

DISCLOSURE OF THE INVENTION

With parenthetical reference to the corresponding parts, portions or surfaces of the disclosed embodiment, merely for purposes of illustration and not by way of limitation, the present invention broadly provides an improved multi-spindle automatic screw machine, such as a Davenport® multi-spindle automatic screw machine, incorporating a radially-tighter, but yet freely-rotatable, connection between a tool arm and a revolving head cap, and further provides an improved tool arm shaft for use with such a connection.

In one aspect, the invention provides a multi-spindle automatic screw machine, such as a Davenport® multi-spindle automatic screw machine, having a tool arm (14) mounted on a shaft (41) for rotational movement relative to a revolving head cap (13), wherein the improvement comprises: at least one needle bearing (42) operatively arranged between a portion of the shaft and a portion of the revolving head cap; and wherein the bearing is radially loaded as the bearing is installed such that the individual needles of same are elastically deformed immediately after the bearing has been installed.

The needle bearing may be axially press-fit between the shaft portion and the revolving head cap portion when the bearing is installed. The shaft portion (52) may be hardened, or be provided with a hardened surface. The shaft may be formed of a high-carbon high-alloy steel. The diameter of the shaft hardened portion may be greater than the diameters of the adjacent shaft portions on either side thereof. A first annular recess (51) may extend into the shaft between the shaft hardened portion and the adjacent shaft portion on one side thereof. This first annular recess may include a frusto-conical surface communicating with one end of the shaft hardened portion. A second annular recess (53) may extend into the shaft between the shaft hardened portion and the adjacent shaft portion on the other side thereof. This second annular recess may include a frusto-conical surface (55) communicating with the other end of the shaft hardened portion.

In another aspect, the invention provides an improved tool arm shaft (41) for use in an automatic screw machine, such as a Davenport® multi-spindle automatic screw machine, to provide a rotative connection between a portion of a tool arm and a portion of a revolving head cap. The improved shaft has a portion that has been hardened in the vicinity of the rotative connection.

In one form, the shaft portion has a hardened surface (52). The shaft may be formed of a high-carbon high-alloy steel.

The diameter of the shaft hardened portion may be greater than the diameters of the adjacent shaft portions on either side thereof. A first annular recess (51) may extend into the shaft between the shaft hardened portion (52) and the adjacent shaft portion (50) on one side thereof. This first annular recess may includes a frusto-conical surface communicating with one end of the shaft hardened portion. A second annular recess (53) may extend into the shaft between the shaft hardened portion (52) and the adjacent shaft portion (54) on the other side thereof. This second annular recess may include a frusto-conical surface (55) communicating with the other end of the shaft hardened portion.

Accordingly, the general object of the invention is to provide an improved multi-spindle automatic screw machine, such as a Davenport® multi-spindle automatic screw machine, having a tool arm (14) mounted on a shaft (41) for rotational movement relative to a revolving head cap (13).

Another object is to provide an improved tool arm shaft for use in a multi-spindle automatic screw machine, such as a Davenport® multi-spindle automatic screw machine, to provide a rotative connection between a portion of a tool arm (14) and a portion of a revolving head cap (13).

Still another object is to provide a tighter-fitting rotative connection between a tool arm (14) and a revolving head cap (13) of a Davenport® multi-spindle automatic screw machine that affords the advantages and capabilities of reduced tool chatter, increased tool life, tighter part tolerances, more aggressive relative speeds and feeds between the tool and a workpiece, and substantially-extended service intervals in the most demanding applications. In some cases, the service interval may be extended by about fifty times the service interval associated with prior art bronze bushing embodiments.

These and other objects and advantages will become apparent from the foregoing and ongoing written specification, the drawings and the appended claims.

DESCRIPTION OF THE PREFERRED EMBODIMENTS

Figure 1:
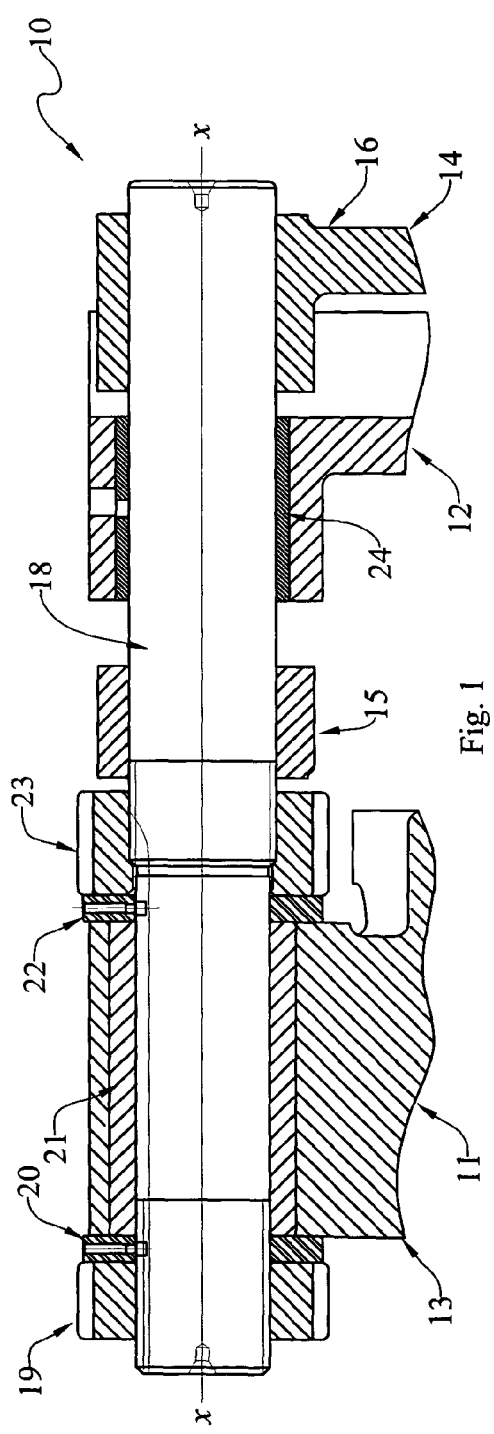
FIG. 1 is a fragmentary longitudinal view, partly in section and partly in elevation, of a prior art tool arm stud assembly having a bronze bushing operatively arranged between the rotatable shaft and a portion of the revolving head cap.

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Figure 3:
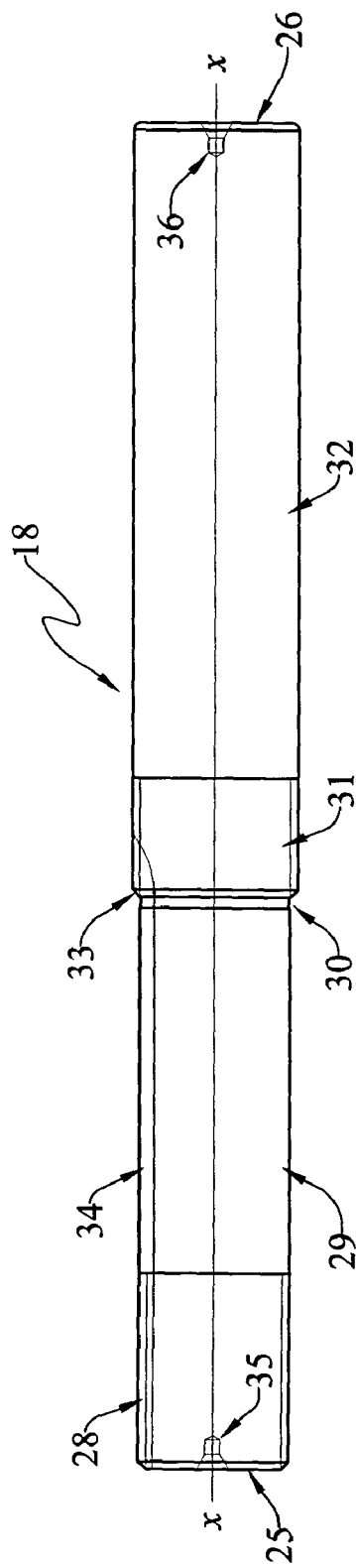
FIG. 3 is a longitudinal side elevation of the prior art stud shaft shown in FIG. 1.

Prior Art Tool Arm Stud Shaft Assembly (FIGS. 1 and 3)

Referring now to the drawings, and, more particularly, to FIG. 1 thereof, a prior art tool arm stud shaft assembly is generally indicated at 10. This assembly is shown as including portions 11, 12 of a revolving head cap 13 of a Davenport® multi-spindle automatic screw machine, and a tool arm, generally indicated at 14, separate portions of which are indicated at 15, 16. A tool is adapted to be mounted on non-illustrated portions of the tool arm, and is adapted to be selectively moved into or out of engagement with a rotating chuck-held workpiece (not shown) by selectively causing the tool arm 14 to rotate about horizontal axis x-x relative to the revolving head cap 13.

To this end, the assembly 10 further includes a horizontally-elongated tool arm shaft, generally indicated at 18, that is shown as penetrating aligned openings in the revolving head cap and the tool arm, respectively. Shaft 18 is held in this position by means of a rear nut 19 which is threaded on the left marginal end portion of shaft 18, and which acts against a rear washer 20. A horizontally-elongated cylindrical cast iron sleeve or bushing 21 surrounds a portion of the shaft within head cap portion 11. This bushing is normally fixed to the shaft for rotation therewith. A front washer 22 acts between the right marginal end portion of bushing 21 and a front nut 23.

At the right end of the assembly, tool arm portion 16 is fixed to the shaft for rotation therewith. A horizontally-elongated cylindrical bronze bushing 24 was operatively arranged between the shaft and head cap portion 12. There was normally an initial radial clearance of about 0.001 inches between the bushing and shaft to allow free rotation of the shaft 18 relative to head cap 13.

In this prior art embodiment, the shaft was formed of a suitable low-carbon low-alloy steel, which was relatively inexpensive.

While this prior art arrangement has worked well for many years, it is now realized that the increases in the radial spacing between bushing 24 and shaft 18, such as caused by wear, has contributed to unnecessary tool chatter, decreased tool life, looser part tolerances, less-aggressive relative speeds and feeds between the tool and the work-piece, and shortened service intervals in the most demanding of machining applications.

FIG. 3 is an longitudinal side elevation of the shaft 18 shown in FIG. 1. Shaft 18 is shown as having in pertinent part: an annular vertical left end face 25, an annular vertical right end face 26, and an outer surface which sequentially includes (from left-to-right in FIG. 3): an externally threaded portion 28 extending rightwardly from left end face 25, an outwardly-facing horizontal cylindrical surface 29, an annular recess 30 extending into the shaft from its outer surface, an externally-threaded portion 31 of enlarged diameter extending rightwardly from the recess, and an outwardly-facing horizontal cylindrical surface 32 continuing rightwardly therefrom to join right end face 26. A leftwardly- and outwardly-facing frusto-conical surface 33 extends between the recess 30 and threaded surface 32. A longitudinal keyway 34 extends rightwardly into the shaft from its left end face 25 and opens onto intermediate threaded surface 31. This keyway was provided to accommodate a means (not shown) by which bushing 21 could be made fast to shaft 18 for rotation therewith. In one form, two pins protruded inwardly from the bores of washers 20, 22. These pins were originally intended to help prevent rotation of these washers, and thereby prevent loosening and rotation of nuts 19,23. Experience has found that these pins are unnecessary. Replacement washers without these pins appear to function just as well, and loosening and rotation of nuts 19. 23 does not appear to occur with such washers.

Left and right recesses 35, 36 extend axially into shaft 18 from its left and right end faces 25, 26, respectively. These recesses are only used in machining the shape of the shaft, and do not effect its operation in the tool arm assembly.

In this prior art embodiment, the revolving head cap 13 was typically formed of cast iron. Sleeve 21 was also typically formed of cast iron. However, the shaft itself was formed of a low-carbon low-alloy steel. As indicated above, the initial diametrical clearance on the order of 0.001 inches between the bronze bushing 24 and the shaft. Thus, the tool arm 14, which was mounted fast to shaft 18, could be selectively rotated relative to the revolving head cap by suitable means (not shown). However, the diametrical clearance, small as it may have been, between bronze bushing 24 and head cap portion 12, permitted some radial movement of tool arm portion 16 relative to head cap portion 12, and increased with wear. This radial movement was believed to contribute to decreased tool life, looser part tolerances, less-aggressive speeds and feeds between the tool and the workpiece, and shortened service intervals in demanding machining applications.

Figure 2:
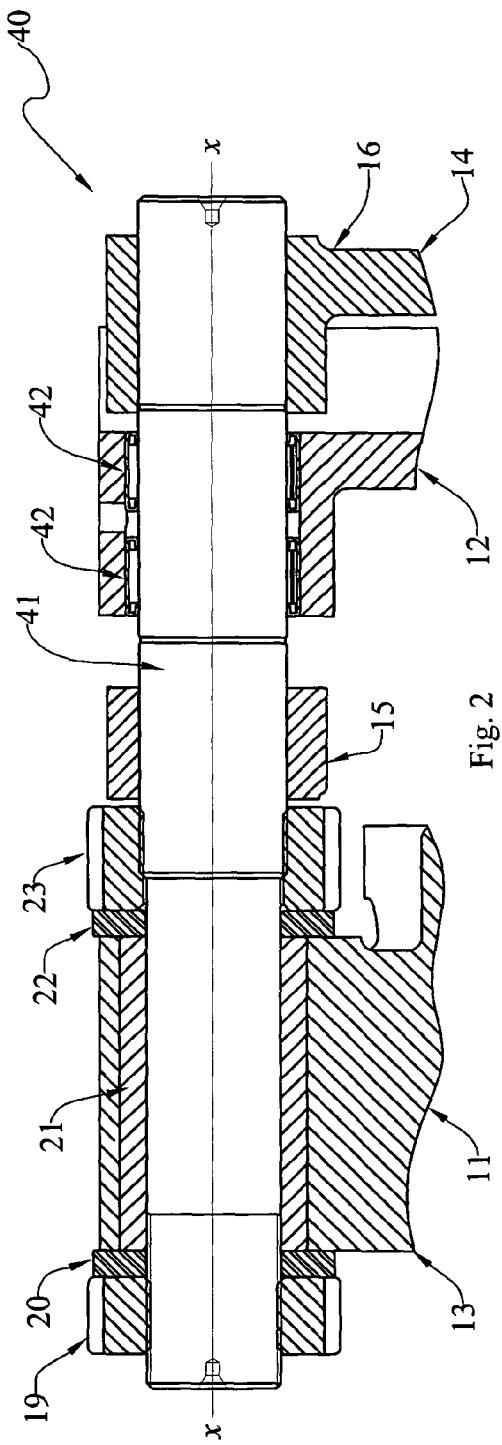
FIG. 2 is a fragmentary longitudinal view, partly in section and partly in elevation, of an improved tool arm stud assembly having a needle bearing press-fitted into the space between the rotatable shaft and a portion of the revolving head cap.
Figure 5:
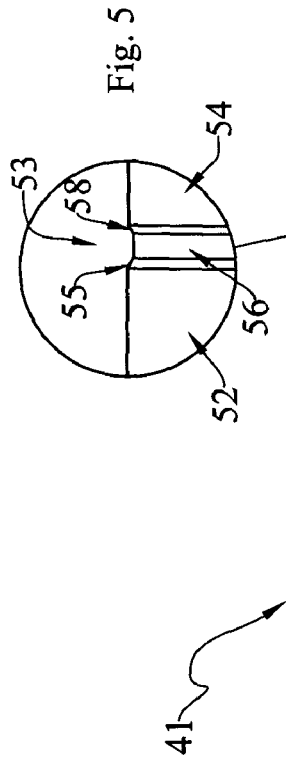
FIG. 5 is a greatly-enlarged detail view of the annular recess extending into the improved stud shaft to the immediate right of the shaft hardened portion, this view being taken of the indicated area in FIG. 4.
Figure 4:
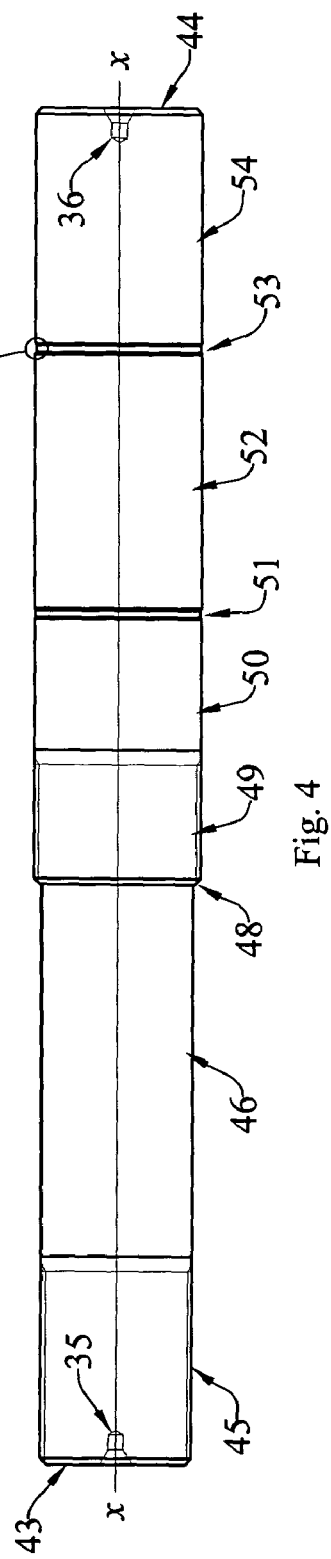
FIG. 4 is a longitudinal side elevation of the improved stud shaft shown in FIG. 2.

Improved Tool Arm Stud Shaft Assembly (FIGS. 2, 4 and 5)

FIG. 2 is fragmentary longitudinal view, partly in section and partly in elevation, of an improved tool arm stud shaft assembly, now generally indicated at 40. The improved stud shaft, generally indicated at 41, is adapted to be positioned between portions of a revolving head cap and a tool arm, as previously described. Hence, the same reference numerals have been used to identify the same structure previous described. The salient difference between the improved stud shaft assembly shown in FIG. 2 and the prior art stud shaft assembly shown in FIG. 1, is that the improved stud shaft assembly employs a pair of axially-spaced needle bearings, severally indicated at 42, in lieu of bronze bushing 24 between portions of the head cap and the shaft. In addition to this, the proximate portion of the shaft which is radially inward of the needle bearings has been hardened, or at least surface hardened, so that when the needle bearings are axially press-fitted into engagement between the head cap and the shaft, the individual needles thereof will be compressed after installation.

The improved stud shaft 41 is more clearly shown in FIG. 4. In that view, shaft 41 is shown as including an annular vertical left end face 43, an annular vertical right end face 44, and an outer surface which sequentially includes in pertinent part (from left-to-right in FIG. 4): an externally threaded portion 45 extending rightwardly from left end face 43; an outwardly-facing cylindrical portion 46; a leftwardly- and outwardly-facing frusto-conical surface 48; an externally-threaded portion 49; an outwardly-facing horizontal cylindrical surface 50; a first annular groove, generally indicated at 51; an intermediate cylindrical surface portion 52; a second annular groove, generally indicated at 53; and a horizontal cylindrical outer surface 54 continuing rightwardly to join right end face 45.

The structure of groove 53 is shown in FIG. 5. There, groove 53 is shown as having an outwardly- and rightwardly-facing frusto-conical surface 55, a recess bottom surface 56, and a leftwardly- and outwardly-facing frusto-conical surface 58 and continuing rightwardly from bottom surface 56 to join surface 54. These frusto-conical surfaces are provided to act as ramps or inclined planes to facilitate sliding axial insertion of the needle bearings when the improved stud assembly is assembled.

Here again, axial recesses 35, 36 extend axially into the improved stud shaft from its left and right end faces 43, 44, respectively. These recesses are used to provide a center for rotation when the improved stud shaft is machined, but are not material to the operation of the shaft when assembled in the machine.

In the preferred embodiment, the diameter of shaft portion 52 is slightly larger than adjacent portions 50, 54 so that the needle bearing may be readily slipped over portions 50 or 54 when they are press-fit into engagement with shaft portion 52. Moreover, whereas the prior art shaft shown in FIG. 3 was formed of a low-carbon low-alloy steel, the improved shaft 41 is formed of a high-carbon high-alloy steel. Moreover, portion 52 is hardened, as by induction hardening, flame hardening or the like, to an elevated hardness on the Rockwell C scale. The core and all other surfaces on the improved shaft are not hardened, as would be typical of raw material supplied in its annealed state. These non-hardened portions retain greater ductility, and are better able to resist the shock loads applied to the shaft. However, it is important that shaft portion 52 be surfaced hardened to resist wear and deformation because the individual needles of bearings 42, 42 will engage and run on the outer surface of that shaft. In the prior art shaft shown in FIG. 3, there was no heat treatment of any particular portion of shaft 18.

As indicated above, when the improved tool arm assembly 40 is created, needle bearings 42, 42 are axially press-fit into the annular space between head cap portion 12 and shaft surface 52. After they have been press-fit into this position, the individual needles of the bearings remain elastically deformed by the radial load.

The significance of the invention is that the use of needle bearings 42 over bushing 24, as complimented by shaft portion 52, removes the diametrical space or clearance that had existed in the prior art. Hence, the improved tool arm has the capability of reduced tool chatter, increased tool life, tighter part tolerances, more-aggressive relative speeds and feeds between the tool and workpiece, and substantially extended service intervals in the most demanding of machining applications. With respect to this latter point, the service interval has, in some instances, been increased by a factor of about fifty. With the prior art arrangement shown in FIG. 1, some service intervals were as short as about one week. With the improved tool arm stud assembly shown in FIG. 2, this service interval under the same demanding machining applications maybe extended to about one year, this representing an approximate fifty-fold increase.

Modifications

The present invention contemplates that may changes and modifications may be made.

For example, unless expressly indicated in the appended claims, the materials of construction, the manner by which the portion or surface of the improved shaft, or the dimensions and tolerances, are not deemed to be critical. The improved assembly may have one or more axially-spaced needle bearings, as desired. The shapes and configurations of the various parts and components are not deemed to be particularly critical, absent a limitation in a claim, and may be readily changed or modified. Hardening treatments other than flame-hardening and induction-hardening may be employed.

Therefore, while the presently-preferred form of the improved needle bearing tool arm stud assembly as been shown and described, and several modifications thereof discussed, persons skilled in this art will readily appreciate that various additional changes and modifications may be made without departing from the spirit of the invention, as defined and differentiated by the following claims.

What is claimed is:

1. A multi-spindle automatic screw machine having a tool arm mounted on a shaft for rotational movement relative to a revolving head cap, said shaft being journalled on said head cap at two axially-spaced locations on said shaft, one of said locations being closer to said tool arm and the other of said locations being farther from said tool arm, wherein the improvement comprises:

said shaft having an enlarged portion proximate said one location that has a diameter greater than the diameters of the adjacent shaft portions on either side thereof;

said shaft enlarged portion having a hardened surface;

a needle bearing operatively arranged between said shaft enlarged portion and a portion of said revolving head cap such that said bearing is radially loaded with the individual needles of said needle bearing being elastically deformed;

whereby said tool arm has the capability of reduced tool chatter, increased tool life, tighter part tolerances, more aggressive relative speeds and fees between the said tool and a workpiece, and substantially extended service intervals.

2. The improvement as set forth in claim 1 wherein said shaft enlarged portion is hardened.

3. The improvement as set forth in claim 1 wherein said shaft is formed of a high-carbon high-alloy steel.

4. The improvement as set forth in claim 1 wherein a first annular recess extends into said shaft between said shaft enlarged portion and the adjacent shaft portion on one side thereof.

5. The improvement as set forth in claim 4 wherein said first annular recess includes a frusta-conical surface communicating with one end of said shaft enlarged portion.

6. The improvement as set forth in claim 5 wherein a second annular recess extends into said shaft between said shaft enlarged portion and the adjacent shaft portion on the other side thereof.

7. The improvement as set forth in claim 6 wherein said second annular recess includes a frusto-conical surface communicating with the other end of said shaft enlarged portion.

* * * * *